(12) United States Patent
Solinski

(10) Patent No.: US 6,797,088 B2
(45) Date of Patent: Sep. 28, 2004

(54) METHOD FOR THE CONNECTION OF PIECES OF TEXTILE FABRIC

(75) Inventor: Knut Georg Solinski, Santa Coloma (AD)

(73) Assignee: Imtex S.L., Principat (AD)

( * ) Notice: Subject to any disclaimer, the term of this patent is extended or adjusted under 35 U.S.C. 154(b) by 23 days.

(21) Appl. No.: 10/146,385

(22) Filed: May 13, 2002

(65) Prior Publication Data

US 2002/0174933 A1 Nov. 28, 2002

(30) Foreign Application Priority Data

May 14, 2001 (DE) .......................................... 101 23 309

(51) Int. Cl.[7] .............................................. B29C 65/08
(52) U.S. Cl. ..................... 156/73.4; 156/73.1; 156/159; 156/580.2
(58) Field of Search .............................. 156/73.1, 73.3, 156/73.4, 157, 159, 250, 251, 290, 292, 308.2, 308.4, 309.6, 502, 510, 515, 580.1, 580.2; 428/57, 58

(56) References Cited

U.S. PATENT DOCUMENTS

| 4,018,955 | A | * | 4/1977 | Klauke et al. ................. 428/57 |
| 4,327,448 | A | | 5/1982 | Lunt |
| 4,501,782 | A | | 2/1985 | Weatherly et al. |
| 4,904,319 | A | * | 2/1990 | Divincenzo et al. ....... 156/73.4 |
| 5,085,719 | A | * | 2/1992 | Eck ............................ 156/73.4 |
| 5,230,761 | A | * | 7/1993 | Crawford ................... 156/73.3 |
| 5,286,542 | A | | 2/1994 | Susi et al. |
| 5,746,856 | A | * | 5/1998 | Hendershot et al. ....... 156/73.4 |
| 5,932,041 | A | * | 8/1999 | Dolling et al. ............. 156/73.3 |

FOREIGN PATENT DOCUMENTS

| CH | 615965 | 2/1980 |
| DE | 4233878 | 4/1994 |
| DE | 19532499 | 3/1997 |
| EP | 0015871 | 9/1980 |
| EP | 0164236 | 12/1985 |
| EP | 0749701 | 6/1996 |

OTHER PUBLICATIONS

Article Entitled "Introduction to the Technique of Ultrasonics", Kunststofftechnik 10 (1971) NR. 9, p. 299.

* cited by examiner

*Primary Examiner*—James Sells
(74) *Attorney, Agent, or Firm*—Bachman & LaPointe, PC

(57) ABSTRACT

The invention relates to a method for the connection of pieces of textile fabric, a textile band and a method for producing same. In order to provide a textile band or continuous textile product which is suitable for continuous processing, it is proposed that, for the connection of pieces of textile fabric, a cut edge, at which the threads are essentially bound at the edge, is first formed. The textile pieces are then laid one on the other with an overlap, and are pressed one onto the other between a sonotrode and an anvil, where the anvil and/or the sonotrode have a surface profile with a number of elevations, The textile pieces are connected to each other by introducing an ultrasonic oscillation into the sonotrode, thus welding the textile pieces to one another ultrasonically.

17 Claims, 2 Drawing Sheets

METHOD FOR THE CONNECTION OF PIECES OF TEXTILE FABRIC

BACKGROUND OF THE INVENTION

The invention relates to a method for the connection of pieces of textile fabric. More particularly, the invention relates to a method for the production of a textile band and a textile band thus produced.

Textile materials are used in large quantities in the production of a multiplicity of products. As an example, the production of a mattress may be mentioned here, in which a band is fed mechanically and is stitched to the mattress all round the latter.

For the mechanical processing of textiles of this type, continuously produced textiles, for example bands, are required. These are, for example, applied to suitable carriers, for example wound on rolls, or introduced loosely in containers. However, in the continuous production of textiles by means of known production methods, for example weaving, braiding, double ribbing, knitting, the formation of defects cannot be entirely ruled out. Defects of this kind may be discovered during a subsequent check. However, there is no possibility of removing such defects other than cutting the textile product. This yields continuous textile products of varying length.

This, in turn, presents serious difficulties in the continuous processing of such a continuous textile product. If a delivered unit contains a plurality of portions of irregular length, the respective lengths have to be taken into account during processing. For example, for processing a band by sewing on a mattress, a band has to be fed in one piece, so that it is always necessary to check whether there is still sufficient band length. This leads to a very high outlay.

It is thus desirable to provide a method of reconnecting the ends of a textile product after cutting out the defective part.

A known method of connection for textiles which have a certain proportion of synthetic fibres is welding with the aid of ultrasound. EP-A-001581 describes such a method for the connection of textiles which have a proportion of at least 50% of thermoplastic fibres or threads. Two textile pieces are pressed together between a sonotrode and an anvil and vibrations are generated in the ultrasonic range. A number of welds which are arranged in two rows are produced by small tips. The document recommends that paper be interposed in order to distribute the pressure more effectively and achieve greater strength.

DE-A-42 33 878 shows a device for the welding and separation of edging bands in the production of blankets. The upper and lower parts of a band stitched longitudinally to a blanket are welded ultrasonically between an upper and a lower die with the aid of two seams arranged at a distance from one another. The band is separated between the seams thus formed. Plane surfaces are used for welding.

CH-A-615965 presents an ultrasonic sewing machine for the welding of textile material. A ram provided with a welding pattern or with a cutting edge presses the weldable material against a sonotrode capable of being set in vibration ultrasonically.

DE-A-195 32 499 shows a device for ultrasonic cutting, in which an ultrasonic head with a sonotrode and with a working blade, when pressed against a round stay, vibrates at ultrasonic frequency and thus cuts up textile broad-fabric webs. It is indicated that the device may also be used for ultrasonic welding The connection methods known so far achieve the task of connecting pieces of textile fabric. However, the known connections have proven to create problems if the connected products are to be further processed automatically.

BRIEF SUMMARY OF THE INVENTION

The object of the invention is to specify a textile band or continuous textile product and a method for producing it, a textile product suitable for continuous automatical processing being provided in a simple and cost-effective way.

It has not been possible hitherto to reconnect the continuous textile products, in particular bands, cut apart for the removal of defects, in such a way that it has been possible to process them in the same way as fault-free textile products. This is because the corresponding connections must be such that, for example, a band can continue to be processed mechanically, that is to say guided by corresponding feeds. For this purpose, the connections must have, on the one hand, the necessary strength, but, on the other hand, also some elasticity. Moreover, the processability of the band, that is to say, in particular, further stitching, must also be possible even at a connection point.

In the connection method according to the invention, two textile pieces are laid one on the other, with an overlap, between a sonotrode and an anvil and are welded to one another ultrasonically. For this purpose, with the aid of suitable devices known to a person skilled in the art, the sonotrode is set in vibrations, the frequency of which is in the ultrasonic range. The textile pieces clamped between the sonotrode and the anvil functioning as a fixed counterpiece are thereby set in rapid movement, so that the thermoplastic fibres fuse or are plasticized and are connected to one another. This results in a connection of the textile pieces which is uniform over the entire surface.

The invention is based, in this case, on the knowledge that previous methods for the ultrasonic welding of textile pieces either did not offer sufficient strength or did not have sufficient processing properties. This problem is solved, according to the invention, in that the textile pieces are "cut off hot" at the margins of the regions to be connected to one another, that is to say a cut edge is formed such that the threads of the textile fabrics are essentially bound at the edge. It is known to a person skilled in the art that such an effect occurs, for example, as a result of ultrasonic cutting, but can also be achieved by other measures. It is critical that at least large proportions of the threads are bound at the edge, for example by plasticization.

The aim, here, is to form a weld seam at which plasticization of the synthetic fibres contained in the fabric takes place only at particular points, distributed as effectively as possible over the welding region. It has been shown that, in the case of high pressure and a long welding operation, large regions are plasticized, which may be undesirable with regard to the processing properties. In particular, these connections also become brittle, that is to say the textile character is lost.

According to the invention, the surfaces of the anvil and/or sonotrode are not smooth, but have a surface profile. By this is meant a pattern of elevations and depressions. By means of such a profile, the pressure is distributed in a suitable way and the material flow is influenced. As already mentioned, the aim is to maintain the textile character even at the weld. This is achieved by means of a number of locations, distributed over this region, at which plasticization occurs and individual threads are connected. It is preferred that these locations do not merge into one another, but that, between the plasticization locations, there are in each case still portions in which the fabric is still textile, that is to say is not plasticized. The plasticization locations should, as far as possible, be on the inside where the pieces to be connected lie one on the other.

A particularly preferred surface profile is a cross-grooved profile, in which pyramidal elevations arranged in rows and columns are applied closely next to one another on the surface of the anvil. The tips in this case define the locations at which plasticization first occurs.

In a preferred refinement, the two dies, between which the textile pieces are pressed together during processing, that is to say the anvil and sonotrode, have surface profiles. It is preferred, in this case, that surface profiles fitting one into the other be used, that is to say that elevations of one die are located opposite depressions of the other die. For this, because of the clearance which remains in any case, even approximate interengagement is sufficient; the profiles do not have to engage one into the other entirely without a gap.

Both the surface profile and the further method parameters (ultrasonic frequency amplitude, pressure, duration, etc.) should be selected according to the types of fabric to be processed in each case. For example, for very fine fabrics a markedly shorter welding duration, along with markedly lower welding energy, is necessary than for very coarse fabrics. The surface profile should in this case preferably be selected according to the structure of the processed textile fabric. Accordingly, for example, a correspondingly coarse grooving may be selected for coarse fabrics, whilst fine fabrics also require a finer structure of the surface profile.

The connection of the textile pieces is to take place in such a way that the textile character is preserved. This is the case when full-area plasticization does not occur but, instead, merely a fusion of threads of the two textile pieces which takes place at particular points.

The cut edges thus formed may have any desired shapes. Straight edges running transversely to the feed direction are simple. For automatic processing and threading into feeds, it may also be advantageous to have a connection in which the weld seam runs obliquely. Cut edges running correspondingly obliquely are then also preferably formed. In principle, any runs of the weld seam and of the cut edges may be considered, including also curved runs and sinuous shapes.

By two textile pieces, in which the cut edges have previously been formed in this way, being laid one above the other and connected, surprisingly high strength can be achieved even on small overlap regions. Above all, in this case, it is possible to connect the bands permanently, without supplying welding energy for too long. Thus, excessive fusion of the bands is avoided, so that, even at the connection point, the textile character of the bands is preserved and these continue to remain easily processable, that is to say can be pierced for stitching and can also be threaded through mechanical feeds.

When pieces of bands are joined to one another, it is preferred that they be laid one on the other with cut edges pointing away from one another and be welded in the overlap region. A particularly thin seam can thus be formed. The selected width of the overlap region may differ greatly, depending on the application and on the band used. Overlap regions of 0.2 to 2 cm are preferred. A strip having a width of approximately 0.7 cm is particularly preferred as an overlap region. Moreover, at the same time, it is preferred that as large a part of the overlap region as possible also be part of the welded connection. This should be at least 50% of the overlap region, preferably at least 80%, particularly preferably even the entire overlap region. During the welding of two bands of identical width, it is preferred that welding be carried out over the entire width of the bands.

In the method for the production of textile bands the textile bands are first produced continuously and weaving faults which occur are cut out. The cuts are connected to one another by means of the ultrasonic welding method, as already explained above. Thus, bands to be processed continuously can be produced and can be applied to a suitable earlier, for example a roller, or be introduced for further processing into a container. Since the method parameters are selected, depending on material, in such a way that, for example, a band continues to be processable automatically, such carriers can be used in feed devices for the automatic stitching of the band and be fed and processed continuously.

BRIEF DESCRIPTION OF THE DRAWINGS

Embodiments of the invention are described in more detail below with reference to drawings, in which:

FIG. 1 shows a diagrammatic side view of a first embodiment of a device for the connection of two textile bands 10, 12. The elements shown are not depicted true to scale here, but are merely indicated diagrammatically.

Of the device, only an anvil 14 and a sonotrode 16 are illustrated. The sonotrode 16 is part of a device for ultrasonic welding which consists of an ultrasonic generator and of an acoustic head fed by the latter. By means of this device, the sonotrode can be set in vibration, the frequency and amplitude of the vibrations being adjustable.

The bands 10, 12 are textile bands consisting of synthetic fibres. They are, in this example, bands with a width of 4 cm, but very thin bands, for example with a width of 4 mm, or other formats of textiles may also likewise be processed. The term "bands" designates, here, textiles in which the length is substantially greater than the width. The connection technique may be used for widely differing materials, fabrics and purposes. Elastic bands (for example, with a rubber fraction) may be processed, in particular welded to form rings. The connection of broad-fabric textiles is possible, but in this case special precautions must be taken for the uniform distribution of the applied pressure and for the alignment of the edges.

The term "fabric" stands, here, for textiles which are produced by means of one of the many known production methods, for example weaving, double ribbing, knitting, braiding, etc.

In the example illustrated, the bands 10, 12 are severed, straight, in the transverse direction at cut edges 18, 20. In this case, the cut edges are formed by ultrasonically cutting the bands 10, 12. Alternatively, other cutting methods known to a person skilled in the art can be used, where cutting occurs such that the threads of the fabric are essentially bound at the edge.

Figure 1:
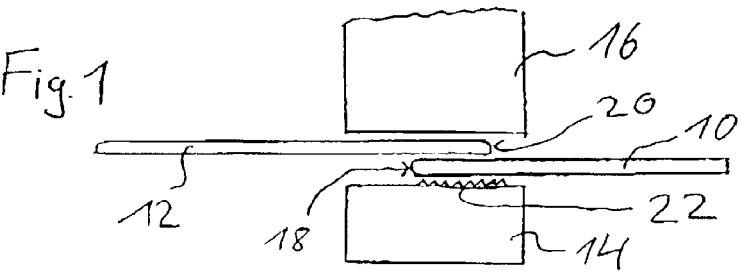
FIG. 1 shows a diagrammatic illustration of a first embodiment of a connection device with two textile pieces.
Figure 2:
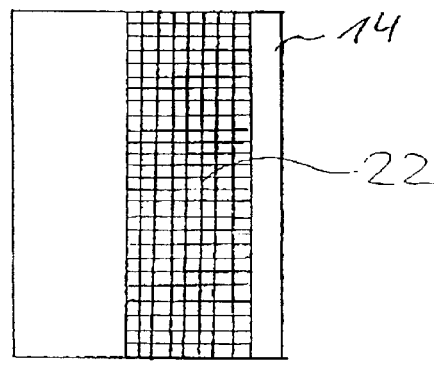
FIG. 2 shows a top view of the anvil with a surface profile.

As illustrated in FIG. 1, the bands 10, 12 are laid one above the other with an overlap, the cut edges pointing away from one another. In this example, the overlap region amounts to approximately 6 mm in the longitudinal direction of the bands, and in the transverse direction the overlap extends over the entire width.

The anvil 14 has a surface profile 22. This is a cross-groove profile, in which in each case pyramids are formed, the tips of which are located 0.5 mm above the base surface and the tips of which are arranged next to one another in rows and columns at a distance of 2.5 mm. This profile has proved to be a good compromise for the processing of a multiplicity of bands of differing fabric structure.

Figure 3:
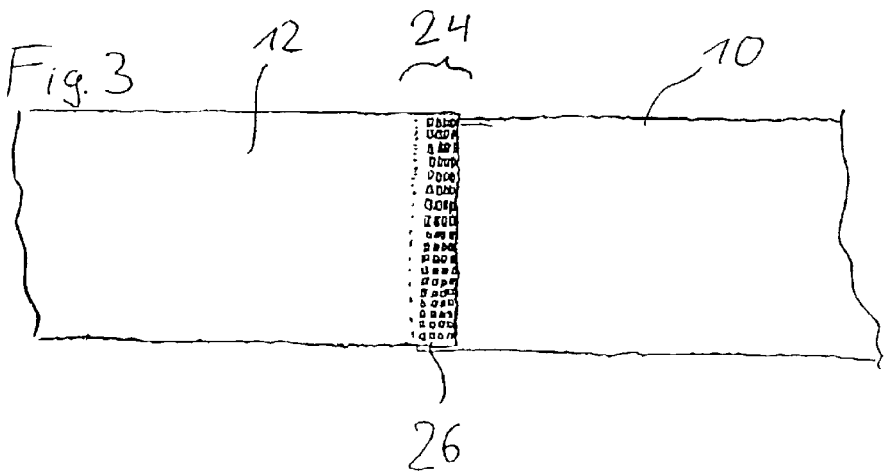
FIG. 3 shows a top view of a first embodiment of two textile bands connected to one another.

FIG. 3 shows a top view of part of the bands 10, 12 which are connected by means of a welded connection 24. The bands 10, 12 are connected to one another in the region of the weld 24, some of the synthetic fibres contained being in each case plasticized and having been connected to threads of the other band. On the front side, illustrated in FIG. 3, of the connection 24, a number of indentations 26 were made by the pyramids of the cross-grooved profile 22. The rear side of the connection 24 is smooth, corresponding to the likewise smooth surface of the sonotrode 16.

Figure 4:
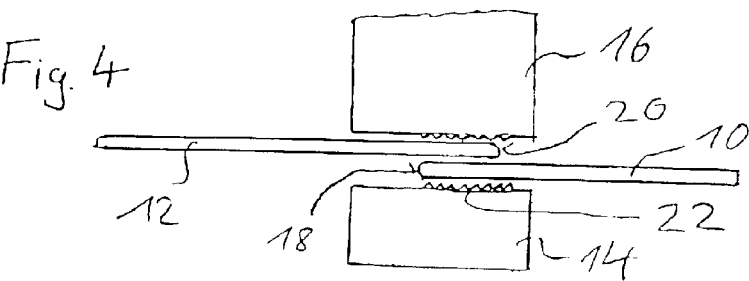
FIG. 4 shows a diagrammatic illustration of a second embodiment of a connection device with two textile pieces.

In a second embodiment, illustrated in FIG. 4, of a connection device, the welding surface of the sonotrode 16 also has a surface profile. This profile corresponds essentially to the negative profile of the surface profile 22. The welded connection 24 thereby formed is not smooth on any of its sides, but on both sides has depressions 26 or corresponding elevations between the depressions.

Figure 5:
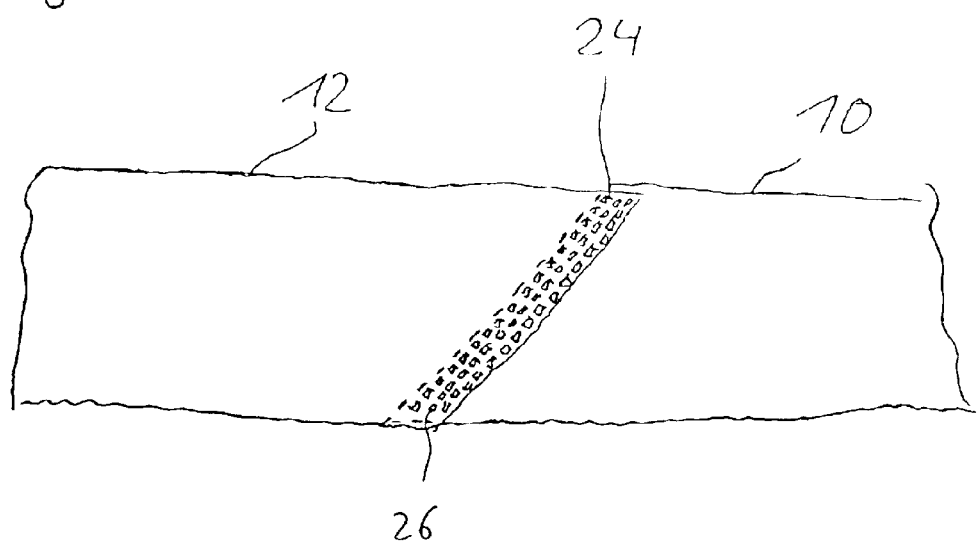
FIG. 5 shows a top view of a second embodiment of two textile bands connected to one another.

FIG. 5 shows a second embodiment of a connection. Here, likewise, two bands 10, 12 are connected by means of a cut 24, as described above. In this case, however, the weld 24 runs obliquely to the longitudinal direction of the band.

By means of the connection method, in particular rolls of continuous textile bands can be manufactured for automatic processing. For this purpose, a continuous band is produced in the usual way. According to a first possibility, the band is checked for weaving faults directly during production and these are cut out when defects occur. The ends thus obtained are connected in the way described above. This results in a continuous band with a length of, for example, 300 m or 500 m on a roll, said band being suitable for automatic processing.

According to a second possibility, the band is woven continually, without the weaving process being interrupted, defects simply being marked. The finished band, together with the corresponding markings, is first rolled up on a roll. In a subsequent rewinding process, the band is unrolled from this roll and rolled up onto a further roll. At the same time, the defects are cut out and the ends obtained are connected in the way described above.

The parameters for the welding operation, in particular applied pressure, amplitude, frequency and duration, can be determined for each connection, that is to say for different types of fabric, by means of simple tests. The aim in this case is to obtain the above-described connections with a textile character. For example, for a band with a width of 3 cm, a welding duration of 0.1 s with an applied pressure of approximately 2 KG/cm$^2$ and with a frequency of 20 kHz has proved favourable.

I claim:

1. A Method for the connection of pieces of textile fabric, where
    a cut edge is formed at each of the textile pieces, at which threads of the textile pieces are essentially bound at the cut edge,
    and the textile pieces are laid one on the other with an overlap,
    and the textile pieces are pressed one onto the other between a sonotrode and an anvil,
    at least one of said sonotrode and said anvil being provided with a surface profile which has a number of elevations,
    and where the textile pieces are connected by introducing an ultrasonic oscillation into the sonotrode, thus welding the textile pieces to one another ultrasonically.

2. The Method of claim 1, where:
    said sonotrode is operated such that said textile pieces are welded together at individual locations corresponding to the elevations in the surface profile,
    where between said locations portions exist in the overlap area, where said textile pieces are not plasticized.

3. The Method of claim 1, where
    both said sonotrode and said anvil are each provided with a surface profile, said surface profiles being configured so as to engage one into the other.

4. The Method of claim 1, where
    the surface profile is selected according to the textile structure of at least one of the textile pieces.

5. The Method of claim 1, where the surface profile is a cross-grooved profile with pyramidal elevations.

6. The Method of claim 1, where an ultrasonic frequency of about 20 kHz is used.

7. The Method of claim 1, where said overlap has a width of about 0.5 to 2 cm.

8. The Method of claim 7, where said overlap has a width of about 1 cm.

9. The Method of claim 1, where the textile pieces are laid one on the other with edges pointing away from one another.

10. The Method of claim 1, where the textile pieces are welded on at least 80% of the overlap region.

11. The Method of claim 10, where the textile pieces are welded over essentially the entire length of the overlap region.

12. The Method of claim 1, where the weld covers essentially the entire width of at least one of the textile pieces.

13. A Method for the production of a textile band, where
    a textile band is being produced continuously,
    a weaving fault occurs, the fault is cut out,
    and the ends of the cut textile band are reconnected by forming a cut edge at each of said ends, at which the threads are essentially bound at the edge,
    and by laying said ends one on the other with an overlap,
    and by pressing said ends one onto the other between a sonotrode, and an anvil,
    at least one of said sonotrode and said anvil being provided with a surface profile which has a number of elevations,
    and by introducing an ultrasonic oscillation into the sonotrode, thus welding said ends to one another,
    and the continuous textile band thus formed, for further processing, is applied to a suitable carrier or introduced into a suitable container.

14. A textile band consisting of continuously produced textile fabric,
    where at one or more locations on the band there are connection points, at which connection points two separate portions of the band are connected to one another,
    where the ends of said portions are arranged one on the other, defining an overlap region, and said ends are connected to one another by a number of weld connections being formed between said portions, said weld connections being distributed over the overlap region.

15. The textile band of claim 14, said band being applied on a carrier.

16. The textile band of claim 14, where said overlap region runs obliquely to the longitudinal direction of the band.

17. A method for the connection of pieces of textile fabric, comprising the steps of:

provided a first and a second piece of continuously produced textile fabric, where each of said pieces has a length which is substantially greater than a width of said piece, forming a cut edge at each of the textile pieces, at which the threads are essentially bound at the edge, said cut edge running in a traverse direction of the textile pieces, laying the textile pieces one on the other with an overlap, said cut edges pointing away from one another, pressing the textile pieces one onto the other between a sonotrode and an anvil, at least one of said sonotrode and said anvil being provided with a surface profile which has a number of elevations, and connecting the textile pieces by introducing an ultrasonic oscillation into the sonotrode, thus welding the textile pieces to one another ultrasonically.

* * * * *